United States Patent [19]

Neumann et al.

[11] Patent Number: 5,889,125
[45] Date of Patent: Mar. 30, 1999

[54] CURING COMPONENT FOR EPOXY RESINS AND THE USE THEREOF

[75] Inventors: Uwe Neumann, Mobile, Ala.; Claus Godau, Kiedrich, Germany

[73] Assignee: Vianova Resins GmbH, Mainz-Kastel, Germany

[21] Appl. No.: 910,223

[22] Filed: Aug. 13, 1997

[30] Foreign Application Priority Data

Aug. 14, 1996 [DE] Germany .......................... 196 32 749.0

[51] Int. Cl.$^6$ .......................... C08G 59/68; C08F 283/00; C08L 61/00
[52] U.S. Cl. .......................... 525/504; 525/523; 528/93; 528/111; 528/120
[58] Field of Search ................ 528/93, 111, 120; 525/504, 523

[56] References Cited

U.S. PATENT DOCUMENTS

| | | | |
|---|---|---|---|
| 2,974,121 | 3/1961 | Salensky | 260/47 |
| 2,977,332 | 3/1961 | Zumstein | 260/18 |
| 3,236,734 | 2/1966 | Charle et al. | 167/88 |
| 3,366,600 | 1/1968 | Haberlin et al. | 260/47 |
| 3,390,124 | 6/1968 | Kittridge | 260/47 |
| 3,751,471 | 8/1973 | Becker | 260/570.5 |
| 3,870,666 | 3/1975 | Becker | 260/21 |
| 3,896,080 | 7/1975 | Vargiu et al. | 260/47 |
| 3,931,298 | 1/1976 | Wollensak | 260/581 |
| 4,164,520 | 8/1979 | Waddill et al. | 525/484 |
| 4,177,174 | 12/1979 | Hayashi et al. | 260/18 |
| 4,269,742 | 5/1981 | Goeke et al. | 260/18 |
| 4,481,349 | 11/1984 | Marten et al. | 528/120 |
| 4,517,343 | 5/1985 | Schupp et al. | 525/488 |
| 4,775,728 | 10/1988 | Goel | 525/523 |
| 5,545,678 | 8/1996 | Giencke et al. | 523/404 |

FOREIGN PATENT DOCUMENTS

| | | |
|---|---|---|
| 0 066 447 | 12/1982 | European Pat. Off. . |
| 0 114 875 | 8/1984 | European Pat. Off. . |
| 2611019 | 9/1977 | Germany . |
| 915 638 | 1/1963 | United Kingdom . |
| 1 397 098 | 8/1972 | United Kingdom . |

OTHER PUBLICATIONS

Journal, "Curing Properties of new curing agent for epoxy resin", Xu et al.; CA 115:93645; Nov. 31, 1990.

Walther et al., "Untersuchungen Aus Dem Organischen Laboratorium der Technischen Hochschule Zu Dresden", (1903) pp. 40–42.

Drake, "The Bucherer Reaction", (1904) pp. 105–125.

Organic Reactions, R. Adams, vol. 1, 1947.

*Primary Examiner*—Randy Gulakowski
*Attorney, Agent, or Firm*—Foley & Lardner

[57] ABSTRACT

A curing component (A) containing amino groups available for reaction with epoxy resins (B), wherein the curing component (A) is a condensation product of di- or polyhydroxyaromatics (A1) with polyamines (A2) is disclosed. The curing component (A) is useful in preparing curing mixtures (C) which include the curing component (A) and at least one epoxy resin (B), whereby the curing mixtures are useful in the production of shaped articles and as coatings.

36 Claims, No Drawings

CURING COMPONENT FOR EPOXY RESINS AND THE USE THEREOF

BACKGROUND OF THE INVENTION

1. Field of the Invention

The present invention relates to a curing component for epoxy resins, a process for its preparation and the use thereof in curable mixtures.

2. Description of Related Art

It is known that alcohols, in particular phenol or alkylated phenols, accelerate the curing reaction between oxiranes and amino groups (cf. U.S. Pat. No. 3,366,600, EP-B 0 114 875, DE-C 10 43 629 and DE-C 20 25 343). It has proved advantageous in these case to form a single compound that combines the phenol component together with the amine component. In DE-C 15 43 754, a hydroxyaryl-substituted aliphatic carboxylic acid is linked with a polyamine via an amide bond to produce a single compound having both a phenol component and an amine component. In this process, however, one amino group of the polyamine, which is required for the amide bond, is lost for the curing operation. In DE-A 32 33 565 and EP-A 0 114 875, the reaction product of a Mannich reaction of aldehydes and polyamines with phenol or alkylphenols, for example cresols, p-tert-butylphenol or nonylphenol, is therefore proposed as the curing component, and in EP-A 0 066 447 reaction products with arylphenols, for example benzylphenol, also are proposed.

U.S. Pat. No. 2,974,121 also discloses adducts of phenols with polyamines which are used for curing epoxy resins, and in particular are used as coatings. The suitable polyamines have at least one, but not more than two amino groups per molecule, the amino groups in each case being bonded to an aliphatic carbon atom. Epoxide-amine adducts are preferred in this document. The phenols disclosed in this document are those that have in each case at least one monohydroxyphenyl group per molecule. Phenols which contain exclusively polyhydroxyphenyl groups, such as resorcinol, hydroquinone and phloroglucinol, are said to provide coatings with matt surfaces, and are therefore not useful for the present invention. The adducts disclosed in this document are formed by heating, without the addition of catalysts, to temperatures between 4 and 104° C., preferably up to 52° C. The adducts are salts of the acid phenol with the amine; the salt is present in an equilibrium, the phenol being liberated again during the (amine-consuming) curing reaction.

These combinations have all proved to be good, but also have disadvantages, such as, in some cases, a lack of acceleration at low temperatures ($\leq 10°C$.) and under high atmospheric humidity, and a lack of resistance to dilute organic acids, such as, for example, acetic acid. Since all these aforementioned combinations comprise phenol or alkylated phenols, they can furthermore be employed to only a limited extent from a toxicological aspect due to the risk to the user during application. When contacted with foodstuffs, the phenols are readily extracted from the coating due to the aqueous dilute organic acids contained therein, such as acetic acid, tartaric acid or citric acid, and thus spoil the foodstuff.

DE-C 10 43 629 also mentions, in addition to the customary phenolic components, polyhydric phenols as possible reactants for curing components which can be prepared by a Mannich reaction. Compounds such as resorcinol and hydroquinone, however, produce highly crosslinked Mannich bases of undesirably high viscosity because of their high reactivity. The increased polarity of polyhydric phenols compared with monohydric phenolic components furthermore causes greater blushing of the coatings produced from them, for example during absorption of water (action of moisture).

SUMMARY OF THE INVENTION

Thus, there exists a need for curing systems for epoxy resins, in which the groups having an accelerating action are incorporated to a high proportion into the network so that their extraction by aqueous dilute organic acids is largely avoided, and which furthermore are also sufficiently reactive at low temperatures and high atmospheric humidity. The curing systems sought should furthermore avoid the problems which occur, in particular, during coating at low temperatures and high atmospheric humidity, such as blushing, smeared surfaces and inadequate crosslinking.

It is therefore an object of the invention to provide curing systems for epoxy resins that do not suffer from the aforementioned disadvantages. It is an additional object of the invention to provide methods of preparing these curing systems for epoxy resins, and to provide curing mixtures that employ these curing systems.

In accordance with these and other objects of the invention, there is provided a curing component (A), containing amino groups, for compounds (B) which contain oxirane groups, (typically called an epoxy resin), wherein the curing component (A) is a condensation product of di- or polyhydroxyaromatics (A1) with polyamines (A2). In accordance with additional objects of the invention, there are provided methods of making curing component (A), curing component (A) made in accordance with those methods, curable mixtures (C) which comprise the curing component (A), in addition to the epoxy resins (B), and to the use of this curing component (A) in curable mixtures (C), in particular paint formulations.

DETAILED DESCRIPTION OF PREFERRED EMBODIMENTS

Curing component (A) according to the invention can be any component that contains amino groups and aromatic groups. Preferably, curing component (A) is a polymer prepared from a di- or polyhydroxyaromatic (A1) with a polyamine (A2) by the mechanism of the Bucherer reaction. The Bucherer reaction is originally the reversible exchange of hydroxyl with amino groups on aromatic ring systems under sulfite catalysis (H. T. Bucherer, J. prakt. Chemie 69, (1904), page 40 et seq.), and is known to those skilled in the art.

This reaction is used industrially to selectively exchange one or more hydroxyl groups for amino groups in polyhydroxyaromatics. Such processes are described in the monograph by N. L. Drake, ORGANIC REACTIONS 1, Chapter 5, *The Bucherer Reaction*, pages 105 to 125 (1947), and in the patent specifications DE-C 11 04 522, DE-C 14 43 311, DE-C 21 40 786 and DE-C 22 08 827. The products described there are used chiefly as dyestuff precursors. A controlled build-up of polymers via the Bucherer reaction, however, is not described in these documents.

The di- or polyhydroxyaromatic (A1) is distinguished by the fact that it preferably contains at least two hydroxyl groups, at least two of its hydroxyl groups being bonded directly in each case to an aromatic ring, such as, for example, to a benzene or naphthalene ring. The di- or polyhydroxyaromatics can be employed here individually or as a mixture. More preferably, the di- or polyhydroxyaromatic (A1) component contains two or three hydroxyl groups.

The di- and polyhydroxyaromatics suitable in this invention can be derived from mono- or polynuclear aromatics, it being possible for the polynuclear aromatics to contain fused-on rings. Other suitable di- and polyhydroxyaromatic components (A1) include those di- and polyhydroxyaromatics in which several aromatic units, such as benzene, naphthalene, anthracene or also heteroaromatic units, are bonded with direct carbon-carbon bonds or by divalent bridges, such as $\alpha,\omega$-alkylene radicals, alkylene radicals in which the two bonding sites are on the same carbon atom, having in each case 1 to 12 carbon atoms in the alkylene radical, which can optionally also be ethylenically unsaturated, such as, for example, cis- or trans-1,2-ethenediyl as well as ether, thioether, azo, carboxamide, carbonyl, carbonyloxy, sulfone and sulfoxide bridges. Examples of polynuclear polyhydroxyaromatics in which the hydroxyl groups are bonded to different aromatic nuclei include 2,2'- and 4,4'-dihydroxybiphenyl, 2,2'- and 4,4'-dihydroxydiphenyl ether, 2,2'- and 4,4'-dihydroxydiphenyl sulfone, 4,4'-dihydroxystilbene and 4,4'-dihydroxybenzophenone.

Other examples of suitable compounds are hydroquinone, pyrocatechol, resorcinol, pyrogallol, phloroglucinol, 1,4- and 1,5-dihydroxynaphthalene, 2,3-, 2,6- and 2,7-dihydroxynaphthalene and alkylated and aralkylated di- or polyhydroxyaromatics, such as have been described, for example, in the patent application EP-A 0 698 591 (DE-A 44 36 097). Di- and trihydroxyaromatics, in particular those in which the hydroxyl groups are on the same aromatic ring, are particularly preferred in this invention. Dihydroxyaromatics, in particular resorcinol and substituted resorcinols, which are prepared by the process described herein, are particularly preferred.

These particularly preferred compounds can be chosen from resorcinol and at least monosubstituted resorcinols, the substituents of which are chosen from linear, branched or cyclic alkyl groups derived from olefins having 4 to 16 carbon atoms and aralkyl groups derived from styrene and homologs thereof, such as $\alpha$-methylstyrene, the isomeric vinyltoluenes and the industrial mixture thereof, the isomeric ethylstyrenes, indene and the halogenated styrenes, such as mono- and dichlorostyrene. These substituted resorcinols can be prepared by methods known in the art, for example, by the reaction of resorcinol and linear, branched or cyclic olefins or the alkenylaromatics mentioned in the context of an electrophilic addition in the presence of a catalyst comprising oxalic acid and boric acid in a ratio of the amounts of substance of 1 mol:5 mol to 1 mol:0 mol. Styrenized resorcinol which contains at least one 2-phenylethyl substituent, and mixtures thereof with unsubstituted resorcinol, are particularly preferred in this invention.

Any polyamine (A2) that reacts with di- or polyhydroxy aromatic compounds as described above, can be used in the invention. Preferably, the polyamine (A2) is distinguished by the fact that it carries at least two primary amino groups, in each case bonded to an aliphatic carbon atom. It can also contain further secondary or tertiary amino groups. Suitable polyamines include polyaminoamides (from aliphatic diamines and aliphatic or aromatic dicarboxylic acids) and polyiminoalkylene-diamines and polyoxyethylene-polyamines, polyoxypropylene-polyamines and mixed polyoxyethylene/polyoxypropylene-polyamines, or amine adducts, such as amine-epoxy resin adducts. The polyamines (A2) can be used individually or as a mixture. Preferably, the amines (A2) contain 2 to 40 carbon atoms. More preferably, the amines of component (A2) are selected from polyoxyalkylene-polyamines and polyiminoalkylene-polyamines having 2 to 4 carbon atoms in the alkylene group, and have a number-average degree of polymerization of 2 to 100, and even more preferably, the amines of component (A2) are linear, branched or cyclic aliphatic primary diaminoalkanes having 2 to 40 carbon atoms. In addition, the amines of component (A2) can be araliphatic amines having at least two primary amino groups, each of which are bonded to an aliphatic carbon atom.

Examples of suitable polyamines include: 1,2-diaminoethane, 1,2-diaminopropane, 1,3-diaminopropane, 1,4-diaminobutane and higher homologs, as well as 2-methyl-1,5-diaminopentane, 1,3-diaminopentane, 2,2,4-trimethyl-1,6-diaminohexane and 2,4,4-trimethyl-1,6-diaminohexane as well as industrial mixtures thereof, 1-amino-3-aminomethyl-3,5,5-trimethylcyclohexane, 2,2-dimethyl-1,3-diaminopropane, 1,3-bis(aminomethyl) cyclohexane, 1,2-diaminocyclohexane, 1,3-bis (aminomethyl)benzene, bis(4-aminocyclohexyl)methane, bis(4-amino-3-methylcyclohexyl)methane, 3-azapentane-1, 5-diamine, 4-azaheptane-1,7-diamine, 3,6-diazaoctane-1,8-diamine, 3(4),8(9)-bis(aminomethyl)tricyclo-[5.2.1.0$^{2,6}$] decane, 3-methyl-3-azapentane-1,5-diamine, 3,6-dioxaoctane-1,8-diamine, 3,6,9-trioxaundecane-1,11-diamine, 4,7-dioxadecane-1,10-diamine, 4,7,10-trioxatridecane-1,13-diamine, 4-aminomethyl-1,8-diaminooctane, 2-butyl-2-ethyl-1,5-diaminopentane as well as diethylenetriamine, triethylenetetramine, pentaethylene-tetramine and the like. Suitable polyoxyalkylenepolyamines can be obtained, for example, under the trade name ®Jeffamine, and suitable polyiminoalkylenepolyamines are available, for example, under the trade name ®Polymin.

The Bucherer reaction of the di- or polyhydroxyaromatic (A1) with the polyamine (A2) preferably proceeds as follows. The mixture of di- or polyhydroxyaromatic (A1), polyamine (A2), if appropriate an entraining agent (D) and if appropriate a catalyst (E) is heated at 150° to 230 ° C., the water of reaction is split off and at the same time distilled off. The entraining agent and the residual water then can be distilled off under reduced pressure (typically 5 to 20 kPa= 50 to 200 mbar) at 100° to 130 ° C. The ratio of the amounts of substance of components (A1) and (A2) preferably is from 10.0 to 1.0 mol/mol to 1.0 to 10.0 mol/mol. Those skilled in the art are capable of carrying out the aforementioned reactions with any of the suitable ingredients, using the guidelines provided herein.

Any entraining agent (D) can be used that forms an azeotrope with water at the reaction temperature. Entraining agents (D) which can be used include all hydrocarbons having a boiling point under normal pressure above 50° C. and a melting point below 20 ° C. which form an azeotrope with water, such as: hexane, cyclohexane, petroleum ether, ligroin, toluene, xylene, ®Shellsol types, manufacturer Shell Chemicals, and ®Solvesso types, manufacturer Esso AG (hydrocarbon distillation cuts which are obtained during distillation of crude oil; mixtures of alkylated aromatics), as well as tetrahydronaphthalene and decalin, and furthermore all alcohols having a boiling point below 200 ° C. under normal pressure which form an azeotrope with water, and contain at least four carbon atoms per molecule. The mass ratio of hydrocarbon (mixture) or alcohol (mixture) to the mixture of di- or polyhydroxyaromatic (A1) with the polyamine (A2) here preferably is from 0.1 to 1.0 g/g to 10 to 1.0 g/g. Mixtures of hydrocarbons and alcohols can also be employed.

Suitable catalysts (E) for the reaction described above include alkali metal and alkaline earth metal sulfites, alkali metal and alkaline earth metal dithionites, boric acid, sulfonic acids, such as p-toluenesulfonic acid or napthylsulfonic acid, oxalic acid, iodine and combinations of (i) salts of aliphatic carboxylic acids chosen from olefinically unsaturated and saturated linear, branched and cyclic mono- and dicarboxylic acids having 2 to 40 carbon atoms, such as formic acid, oxalic acid, acetic acid, propionic acid, naturally occurring fatty acids, 2-ethylhexanoic acid and branched monocarboxylic acids which are obtained from olefins by the Koch process and which are available under the name ®Versatic Acids (Shell Chemicals); together with (ii) at least one component selected from heavy metal ions derived from, for example, iron, cobalt, tin, zinc, manganese, copper and vanadium. The mass fraction of catalyst (E) based on the mass of the mixture of di- or polyhydroxyaromatic (A1) and polyamine (A2) including the catalyst (E), can be anywhere from 0 to 5%, preferably from 0.1 to 5% and more preferably from 0.1 to 4%. Combinations of the above-mentioned catalysts also can be used.

The curable mixture (C) comprises the curing component (A) described above in a mass fraction of 5 to 90%, preferably 20 to 60%, and comprises epoxy component (B) in a mass fraction of from 10 to 95%, preferably from 40 to 80%. If appropriate, the curable mixture (C) can be diluted with amines (F) in order to establish optimum curing properties. Useful amines (F) in this regard include the same amines as those described under polyamines (A2). The curable mixture (C) which then comprises components (A), (B) and (F) can include these amines (F) in mass fractions within the range of from 5 to 90%, preferably from 5 to 40% and more preferably from 10 to 40%. 1,3-bis(aminomethyl) benzene and trimethylhexane-1,6-diamine, as well as a commercially obtainable mixture of 2,2,4-trimethyl-1,6-diaminohexane and 2,4,4-trimethyl-1,6-diaminohexane are preferred.

To avoid blushing of the coatings at low temperatures, primary aliphatic monoamines (G) also can be added to the curable mixture (C) such as is described above. Suitable monoamines include, for example, unbranched 1-aminoalkanes with a preferably saturated alkyl radical of 6 to 22 carbon atoms. The higher representatives of this class of compounds also are called fatty amines. Laurylamine, stearylamine, palmitylamine and behenylamine are preferred. However, monoamines with branched chains also are suitable, for example 2-ethylhexan-1-amine or 3,5,5-trimethylhexan-1-amine. They can be employed individually or as a mixture, and in particular together in a mass fraction of 0.1 to 10%, based on the mass of the curable mixture (C), preferably 1 to 5%.

If appropriate, the curable mixture (C) according to the invention can additionally comprise a diluent (K) which is inert with respect to the reaction between the amine and epoxide. Examples of suitable diluents (K) include aliphatic linear, branched or cyclic ethers having 4 to 20 carbon atoms and mixed aliphatic-aromatic ethers having 7 to 20 carbon atoms, such as dibenzyl ether, tetrahydrofuran, 1,2-dimethoxyethane or methoxybenzene; aliphatic linear, branched or cyclic or mixed aliphatic-aromatic ketones having 4 to 20 carbon atoms, such as butanone, cyclohexanone, methyl isobutyl ketone or acetophenone; aliphatic linear, branched or cyclic or mixed aromatic-aliphatic alcohols having 4 to 20 carbon atoms, such as methanol, ethanol, 2-propanol, benzyl alcohol or furfuryl alcohol; aliphatic linear, branched or cyclic or mixed aromatic-aliphatic hydrocarbons such as toluene, xylene, heptane and mixtures of aliphatic and aromatic hydrocarbons having a boiling range above 100 ° C. under normal pressure, as well as low-viscosity coumarone-indene resins or xylene-formaldehyde resins. Aliphatic alcohols having one phenyl radical, such as benzyl alcohol, 1-phenoxypropane-2,3-diol, 3-phenyl-1-propanol, 2-phenoxy-1-ethanol, 1-phenoxy-2-propanol, 2-phenoxy-1-propanol, 2-phenylethanol, 1-phenyl-1-ethanol or 2-phenyl-1-propanol, are preferred. The diluents (K) can be employed individually or as a mixture, and in particular in total in a mass fraction of from 1 to 25%, based on the mass of the curable mixture (C), and preferably from 5 to 15%.

Customary additives (H), which also can be present in the curable mixture according to the invention include—depending on the particular intended use—customary paint additives, such as pigments, pigment pastes, antioxidants, flow control or thickening agents, defoamers, catalysts, additional hardeners and additional curable compounds. If appropriate, these additives can be added to the mixture only immediately before processing.

To prepare the curable mixtures according to the invention, components (A) and (B) and, if appropriate, (H) are mixed together using any mechanism for mixing. In the case of components of low viscosity, mixing can take place in bulk, the mixture being heated to higher temperatures if appropriate. Products of higher viscosity typically are dissolved or dispersed in the diluents mentioned above, before the mixing operation.

Any known epoxy resin (B) can be cured by the curing component according to the invention, for example those based on 2,2-bis(4-hydroxyphenyl)propane, bis (hydroxyphenyl)methane, polypropylene glycols, novolacs of phenol, cresols, p-tert-butylphenol, nonylphenol and formladehyde, each by itself or as a mixture, and resins diluted with so-called reactive thinners. Those skilled in the art recognize that reactive thinners usually are the glycidyl ethers of the following alcohols: 1,6hexanediol, 1,4-butanediol, p-tert-butylphenol, ortho-cresol, phenol and straight-chain monoalcohols having more than eight carbon atoms. Solid epoxy resins based on the above-mentioned phenols also can be cured with the curing component according to the invention if they are dissolved in a suitable solvent beforehand. A detailed list of suitable epoxide compounds can be found in the handbooks A. M. Paquin, *Epoxidverbindungen und Harze* (Epoxide Compounds and Resins), Springer Verlag, Berlin 1958, Chapter IV and H. Lee and K. Neville, *Handbook of Epoxy Resins*, McGraw-Hill Book Company, New York 1982 Reissue, as well as C. A. May, *Epoxy Resins—Chemistry and Technology*, Marcel Dekker, Inc. New York and Basle, 1988.

The mixtures according to the invention can find various industrial applications because of their favorable properties—above all rapid drying, even at low temperatures and even under high atmospheric humidity with incorporation of the hardener into the network. Typical industrial applications for the mixtures of the invention include, for example, use for the production of shaped articles (casting resins) for tool construction, or for the production of coatings and/or intermediate coatings on many types of substrates, for example, on those of an organic or inorganic nature, such as wood, wood fibers (wood sealing), textiles of natural or synthetic origin, plastics, glass, ceramic and building materials, such as concrete, fiberboards and artificial stones, but in particular on metals, such as optionally pretreated sheet steel, cast iron, aluminium and nonferrous metals, such as brass, bronze and copper. The mixtures according to the invention can furthermore be employed as constituents of adhesives, putties, laminating resins and synthetic resin cements, and in particular as constituents of paints and coatings for coating industrial objects, domestic appliances and furniture and in the building industry, such as, for example, refrigerators, washing machines, electrical appliances, windows and doors. They can be applied, for example, by brushing, spraying, dipping and the like. A particularly preferred field of use for the mixtures according to the invention are paint formulations.

Curing of the mixtures according to the invention typically proceeds very rapidly, and in general can take place at a temperature within the range of from −10° C. to +50° C., preferably from 0° C. to 40° C. For example, products of good hardness can be obtained after only 8 to 24 hours at +5° C. and a relative atmospheric humidity of 95%, or after 1 to 4 hours at room temperature.

EXAMPLES

I. Preparation of Curing Component (A)

In the following examples, all the % data in each case denote mass fractions, unless stated otherwise. The amine number, measured in mg/g, is the quotient of that mass of potassium hydroxide $m_{KOH}$ which consumes just as much acid for neutralization as a mass $m_B$ of a substance B, and this mass $m_B$.

The term "HEW" ("hydrogen equivalent weight") occasionally used in the industry is known as the quotient of the molar mass $M_B$ of a substance B and the number of active hydrogen atoms in a molecule of this substance. Instead of this value, however, its reciprocal will be used which is the specific content of active hydrogen atoms SHC, that is to say the amount of substance of active hydrogen atoms $n_{Ha}$, in the mass $m_B$ of a substance, divided by this mass of the substance $m_B$, usually measured in mol/kg. In the following examples, this value, the amine number and the viscosity are always based on the mass of the mixture of curing components including additives.

Example 1

A mixture of 330 g of resorcinol, 272 g of 1,3-bis(aminomethyl)benzene and 2.0 g of sodium sulfite (anhydrous) was heated to 220° C. in the course of 2 hours and kept at this temperature. After 6 hours, 68 g of water were separated off, and the mixture was then cooled to 190° C. and kept under reduced pressure (5 kPa=50 mbar) for one hour. A dark red solid which was non-tacky at room temperature and had the following values resulted:

| GPC (polystyrene standard) | weight-average molar mass 423 g/mol $M_w$ |
| --- | --- |
| | number-average molar mass 188 g/mol $M_n$ |
| Glass transition temperature (DSC method) | 40.2° C. |
| Amine number: | 351 mg/g |
| Free resorcinol (HPLC): | 1.9% |

The polymer described above (38.7 g) was mixed with 47.3 g of 1,3-bis(aminomethyl)benzene, 11.5 g of benzyl alcohol and 2.5 g of octylamine. Thereafter, the hardener was ready to use and had the following properties.

| Amine number: | 535 mg/g |
| --- | --- |
| SHC: | 16.7 mol/kg |
| HEW: | 60 g/mol |
| Viscosity at 23° C./25 s$^{-1}$: | 1230 mPa · s |

Example 2

Resorcinol (330 g) was heated to 130° C. with 5 g of p-toluenesulfonic acid monohydrate. Styrene (156 g) was added at this temperature in the course of 30 minutes. The mixture was then heated at 150° C. for a further 120 minutes. After cooling, the melt was taken up in 204 g of 1,3-bis(aminomethyl)benzene and 79 g of trimethylhexane-1,6-diamine, a commercially obtainable mixture of 2,2,4-trimethyl-1,6-diaminohexane and 2,4,4-trimethyl-1,6-diaminohexane (Hüls AG). ®Solvesso 150 (Exxon Chemical, mixture of alkylaromatics having a boiling point of 150° C.:50 g) and 2 g of sodium sulfite were added. The mixture was heated to 190° to 200° C., using a water separator. After 6 hours, 69 g of water were separated off, and the entraining agent was then distilled off, first at 220° C. and then at 190° C. under reduced pressure (down to 5 kPa =50 mbar). Finally, the mixture was maintained at this temperature under this pressure for an additional hour. A dark red solid which was non-tacky at room temperature and had the following values resulted:

| GPC (polystyrene standard) | weight-average molar mass 527 g/mol $M_w$ |
| --- | --- |
| | number-average molar mass 218 g/mol $M_n$ |
| Glass transition temperature (DSC method) | 45.3° C. |
| Amine number: | 322 mg/g |
| Free resorcinol (HPLC): | 1.4 % |

The polymer described above (37.3 g) was mixed with 49.2 g of 1,3-bis(aminomethyl)benzene, 11.7 g of 3-phenylpropan-1-ol and 1.8 g of ®Armeen OD (oleylamine/Akzo Chemicals). Thereafter, the hardener was ready to use and had the following properties.

| Amine number: | 530 mg/g |
| --- | --- |
| SHC: | 16.7 mol/kg |
| HEW: | 60 g/mol |
| Viscosity at 23° C./25 s$^{-1}$: | 1870 mPa · s |

Example 3

A mixture of 220 g of resorcinol, 131 g of dipropylenetriamine, 15 g of xylene and 1 g of sodium dithionite was heated at 190 to 200° C. using a water separator. After five hours, 34 g of water were separated off. The entraining agent was distilled off, first at 210° C. under normal pressure and then at 190° C. under reduced pressure (down to 5 kPa=50 mbar). Finally, the mixture was maintained at this temperature under this pressure for an additional hour. A dark brown amorphous solid having the following values resulted:

| GPC (polystyrene standard) | weight-average molar mass 736 g/mol $M_w$ |
| --- | --- |
| | number-average molar mass 604 g/mol $M_n$ |

-continued

| | |
|---|---|
| Glass transition temperature (DSC method) | 54.8° C. |
| Amine number: | 485 mg/g |
| Free resorcinol (HPLC): | 4.6% |

The polymer described above (140.8 g) was mixed with 46.7 g of 1,3-bis(aminomethyl)benzene, 10.5 g of benzyl alcohol and 2.0 g of ®Genamin CC 100 D (mixture of $C_{12}/C_{14}$-fatty amine, Hoechst AG). Thereafter, the hardener was ready to use and had the following properties.

| | |
|---|---|
| Amine number: | 590 mg/g |
| Viscosity at 23° C./25 s$^{-1}$: | 1350 mPa · s |
| SHC: | 17.5 mol/kg |
| HEW: | 57 g/mol |

Example 4

A mixture of 330 g of resorcinol, 173 g of 4-aminomethyl-1,8-diaminooctane, 35 g of xylene and 2.1 g of sodium dithionite was heated at 190° to 200° C. using a water separator. After five hours, 50 g of water were separated off. The entraining agent was distilled off, first at 210° C. under normal pressure and then at 190° C. under reduced pressure (down to 5 kPa=50 mbar). Finally, the mixture was maintained at this temperature under this pressure for an additional hour. A dark brown amorphous solid having the following properties resulted:

| | |
|---|---|
| GPC (polystyrene standard) | weight-average molar mass 1605 g/mol $M_w$ |
| | number-average molar mass 1051 g/mol $M_n$ |
| Glass transition temperature (DSC method) | 50.5° C. |
| Amine number: | 311 mg/g |
| Free resorcinol (HPLC): | 3.4% |

The polymer described above (39.3 g) was mixed with 32.7 g of 1,3-bis(aminomethyl)benzene, 13.5 g of trimethylhexane-1,6-diamine (a commercially obtainable mixture of 2,2,4-trimethyl-1,6-diaminohexane and 2,4,4-trimethyl-1,6-diaminohexane (Hüls AG)), 12.4 g of benzyl alcohol and 2.0 g of octylamine. Thereafter, the hardener was ready to use and had the following properties.

| | |
|---|---|
| Amine number: | 497 mg/g |
| SHC: | 15.6 mol/kg |
| HEW: | 64 g/mol |
| Viscosity at 23° C./25 s$^{-1}$: | 2130 mPa · s |

Comparison Hardener H-V

®Beckopox EH 629, a product of Vianova Resins GmbH, Mannich base from phenol, comprises more than 10% of free phenol (SHC=14.3 mol/kg; HEW=70 g/mol). This product was used as a comparison hardener H-V.

II. Preparation of the Curable Mixtures and use Testing of the Curing Product

Coatings were prepared in the following manner with the products and comparison products mentioned under I and an epoxy resin, and were evaluated in terms of their use.

®Beckopox EP 116 (mixture of bisphenol A diglycidyl ether and bisphenol F diglycidyl ether, specific epoxide group content 5560 mmol/kg; epoxide equivalent 180 g/mol, having a viscosity of about 7.1 Pa·s/25° C.; Vianova Resins GmbH:100 g) was mixed with the amount of the particular hardener corresponding to the particular SHC set out in the table below, and two films 200 μm thick were drawn on in each case two glass plates. One plate was maintained at 24° C. under 40 to 50% relative atmospheric humidity for 24 hours, and the other plate was maintained at +5° C. under ≧95% relative atmospheric humidity for 24 hours. The films were tested for tackiness, clouding, hardness and sensitivity to water. Thereafter, the coated plates were placed in a water-bath (water temperature between 10° and 15° C.) for 30 minutes and, after drying, the change (clouding) in the film and its hardness were evaluated.

As can be seen from the table below, the coatings produced with the curing agents according to the invention have an excellent surface nature, while clouding of greater or lesser severity was observed in the comparison example. This clouding causes other disadvantages which can be eliminated if the curing agent according to the invention was used. On the one hand, as a result of the carbonate or carbamate formation which causes the clouding, the intermediate layer adhesion of another layer applied on top was impaired considerably. On the other hand, due to the carbonate or carbamate formation, the crosslinking density in the cured film was reduced. Points of attack for chemicals, such as dilute organic acids, were formed in the comparison hardeners, and the resistance to chemicals was therefore reduced as a result.

| | | Hardener according to the invention | | | | Comparison |
|---|---|---|---|---|---|---|
| Hardener | | Example 1 | Example 2 | Example 3 | Example 4 | H–V |
| HEW | | 60 | 60 | 57 | 64 | 70 |
| Pot life # | minutes | 20 | 19 | 20 | 17 | 19 |
| Pendulum hardness after curing at room temperature after 1 day | seconds | 215 | 218 | 207 | 202 | 189 |
| Pendulum hardness after curing at room | seconds | 220 | 220 | 217 | 231 | 194 |

-continued

| Hardener | | Hardener according to the invention | | | | Comparison |
|---|---|---|---|---|---|---|
| | | Example 1 | Example 2 | Example 3 | Example 4 | H–V |
| temperature after 7 days | | | | | | |
| Pendulum hardness after curing at +5° C. after 1 day | seconds | 74 | 52 | 59 | 80 | 89 |
| Surface after curing at room temperature after 1 day | * | 0 | 0 | 0 | 0 | 0 non-tacky, clear |
| Surface after curing at +5° C. after 1 day | * | 0 | 0 | 0 | 0 | 2 non-tacky, slightly cloudy |
| Surface after curing at room temperature after 1 day and after 1 hour in water at room temperature | * | 0–1 non-tacky, clear | 0–1 non-tacky, clear | 0–1 non-tacky, clear | 0–1 non-tacky, clear | 3 blushes |
| Surface after curing at +5° C. after 1 day and after 1 hour in water at room temperature | * | 0–1 very slight blushing | 0–1 very slight blushing | 0–1 very slight blushing | 0–1 very slight blushing | 4 blushes |

*for example cloudy, tacky, matt, rough, uneven flow etc.
in a 100 g batch and at 24° C. room temperature
Scale: 0 = excellent to 5 = poor While the invention has been described in detail with reference to particularly preferred embodiments, those skilled in the art will appreciate that various modifications can be made without departing from the spirit and scope thereof. The disclosure of all documents mentioned above are incorporated by reference in their entirety.

What is claimed is:

1. A curing component (A) containing amino groups available for reaction with epoxy resins (B), wherein the curing component (A) is a condensation product of at least one di- or polyhydroxyaromatic (A1) with at least one polyamine (A2).

2. A curing component containing amino groups as claimed in claim 1, wherein the ratio of the amounts of substance of (A1) to (A2) is within the range of from 10.0 to 1.0 mol/mol to 1.0 to 10.0 mol/mol.

3. A curing component containing amino groups as claimed in claim 1, wherein the polyamine (A2) contains at least two primary amino groups, each of the primary amino groups being bonded to an aliphatic carbon atom.

4. A curing component containing amino groups as claimed in claim 1, wherein component (A1) contains at least two hydroxyl groups, each of which are bonded to an aromatic nucleus.

5. A curing component containing amino groups as claimed in claim 1, wherein component (A1) contains two or three hydroxyl groups.

6. A curing component containing amino groups as claimed in claim 5, wherein the hydroxyl groups are bonded to the same aromatic ring.

7. A curing component containing amino groups as claimed in claim 1, wherein component (A1) is selected from resorcinol and at least monosubstituted resorcinols, wherein the substituents are selected from the group consisting of linear, branched or cyclic alkyl groups having 4 to 16 carbon atoms, and resorcinols prepared by the reaction of resorcinol and alkenylaromatics selected from the group consisting of styrene and homologs thereof, isomeric vinyltoluenes and industrial mixtures thereof, isomeric ethylstyrenes, indene and halogenated styrenes by electrophilic addition in the presence of a catalyst comprising oxalic acid and boric acid in the ratio of the amount of substance of 1 mol:5 mol to 1 mol:0 mol.

8. A curing component containing amino groups as claimed in claim 1, wherein component (A1) is selected from the group consisting of resorcinol, styrenized resorcinol and mixtures thereof.

9. A curing component containing amino groups as claimed in claim 1, wherein component (A2) is a diprimary amine.

10. A curing component containing amino groups as claimed in claim 1, wherein the amines of component (A2) contain 2 to 40 carbon atoms.

11. A curing component containing amino groups as claimed in claim 1, wherein the amines of component (A2) are selected from polyoxyalkylene-polyamines and polyiminoalkylene-polyamines having 2 to 4 carbon atoms in the alkylene group, and have a number-average degree of polymerization of 2 to 100.

12. A curing component containing amino groups as claimed in claim 1, wherein the amines of component (A2) are linear, branched or cyclic aliphatic primary diaminoalkanes having 2 to 40 carbon atoms.

13. A curing component containing amino groups as claimed in claim 1, wherein the amines of component (A2) are araliphatic amines having at least two primary amino groups, each of which are bonded to an aliphatic carbon atom.

14. A process for preparing a curing component containing amino groups as claimed in claim 1, which comprises:
   heating a mixture of components (A1) and (A2) to a reaction temperature within the range of from 150° to 230° C.; and
   removing the water formed in the reaction by distillation.

15. The process as claimed in claim 14, wherein an entraining agent (D) which forms an azeotrope with water is added to the mixture of components (A1) and (A2).

16. The process as claimed in claim 14, wherein a catalyst is employed and comprises (i) at least one component selected from the group consisting of alkali metal and alkaline earth metal sulfites, alkali metal and alkaline earth metal dithionites, boric acid, aromatic sulfonic acids, oxalic acid and salts of aliphatic carboxylic acids selected from the group consisting of olefinically unsaturated and saturated linear, branched and cyclic mono- and dicarboxylic acids having 2 to 40 carbon atoms, and (ii) at least one component selected from the group consisting of iron, cobalt, tin, zinc, manganese, copper and vanadium.

17. The process as claimed in claim 14, wherein the catalyst is employed in a mass fraction of 0.1 to 5%, based on the mass of the mixture of components (A1) and (A2).

18. The process as claimed in claim 15, wherein the entraining agent (D) is employed in a mass ratio within the range of from 0.1 g:1 g to 10 g:1 g, based on the mass of the mixture of components (A1) and (A2).

19. A curable mixture (C) comprising a curing component (A) as claimed in claim 1 together with at least one epoxy resin (B).

20. A curable mixture (C) as claimed in claim 19, which comprises mass fractions of 5 to 90% of a curing component (A) and 10 to 95% of an epoxy resin (B).

21. A curable mixture (C) as claimed in claim 20, further comprising a polyamine (F) in a mass fraction within the range of from 5 to 40%, based on the sum of the masses of components (A), (B) and (F), said polyamine (F) being the same as component (A2).

22. A curable mixture (C) as claimed in claim 21, wherein the polyamine (F) is 1,3-bis(aminomethyl)benzene.

23. A curable mixture (C) as claimed in claim 21, wherein the polyamine (F) is trimethylhexane-1,6-diamine.

24. A polymer containing amino groups available for reaction with epoxy resins (B), wherein the polymer is a condensation product of at least one di- or polyhydroxyaromatic (A1) with at least one polyamine (A2).

25. A polymer containing amino groups as claimed in claim 24, wherein the ratio of the amounts of substance of (A1) is within the range of from 10.0 to 1.0 mol/mol to 1.0 to 10.0 mol/mol.

26. A polymer containing amino groups as claimed in claim 24, wherein the polyamine (A2) contains at least two primary amino groups, each of the primary amino groups being bonded to an aliphatic carbon atom.

27. A polymer containing amino groups as claimed in claim 24, wherein component (A1) contains at least two hydroxyl groups, each of which are bonded to an aromatic nucleus.

28. A polymer containing amino groups as claimed in claim 24, wherein component (A1) contains two or three hydroxyl groups.

29. A polymer containing amino groups as claimed in claim 28, wherein the hydroxyl groups are bonded to the same aromatic ring.

30. A polymer containing amino groups as claimed in claim 24, wherein component (A1) is selected from resorcinol and at least monosubstituted resorcinols, wherein the substituents are selected from the group consisting of linear, branched or cyclic alkyl groups having 4 to 16 carbon atoms, and resorcinols that can be prepared by the reaction of resorcinol and alkenylaromatics selected from the group consisting of styrene and homologues thereof, isomeric vinyl toluenes and industrial mixtures thereof, isomeric ethyl styrenes, indene and halogenated styrenes by electrophilic addition in the presence of a catalyst comprising oxalic acid and boric acid in the ratio of the amount of substance of 1 mol:5 mol to 1 mol:0 mol.

31. A polymer containing amino groups as claimed in claim 24, wherein component (A1) is selected from the group consisting of resorcinol, styrenised resorcinol and mixtures thereof.

32. A polymer containing amino groups as claimed in claim 24, wherein component (A2) is a diprimary amine.

33. A polymer containing amino groups as claimed in claim 24, wherein the amines of component (A2) contain 2 to 40 carbon atoms.

34. A polymer containing amino groups as claimed in claim 24, wherein the amines of component (A2) are selected from polyoxyalkylene-polyamines and polyiminoalkylene-polyamines having 2 to 4 carbon atoms in the alkylene group, and have a number-average degree of polymerization of 2 to 100.

35. A polymer containing amino groups as claimed in claim 24, wherein the amines of component (A2) are linear, branched or cyclic aliphatic primary diaminoalkanes having 2 to 40 carbon atoms.

36. A polymer containing amino groups as claimed in claim 24, wherein the amines of component (A2) are araliphatic amines having at least two primary amino groups, each of which are bonded to an aliphatic carbon atom.

* * * * *